United States Patent Office 3,384,620
Patented May 21, 1968

3,384,620
POLYACETAL TERPOLYMERS CONTAINING RANDOMLY RECURRING GROUPS DERIVED FROM AN AROMATIC ACETAL
Henri Sidi, Paramus, N.J., assignor to Tenneco Chemicals, Inc., a corporation of Delaware
No Drawing. Filed Aug. 28, 1964, Ser. No. 392,899
3 Claims. (Cl. 260—67)

ABSTRACT OF THE DISCLOSURE

Certain aromatic acetals may be copolymerized with formaldehyde or with its cyclic trimer, trioxane, to form a new class of polyacetal copolymers and terpolymers which contain randomly recurring groups derived from the aromatic acetal. These new polyacetal copolymers and terpolymers are characterized by viscosimetrically-determined average molecular weights in the range from 10,000 to 100,000, and by excellent thermal and hydrolytic stability.

This invention relates to formaldehyde copolymers and, more particularly, to a new class of high molecular weight interpolymers of formaldehyde (or trioxane) and certain aromatic acetals, as well as to the process by which these interpolymers are prepared. These new copolymers or interpolymers, the terms being interchangeably used, are particularly suitable for molding application, and may be fabricated into films, filaments, fibers, rods and tubes. The new copolymers of the invention are characterized by excellent thermal and hydrolytic stability and in many ways are more stable than any commercially available homopolymer or copolymer of formaldehyde.

The new class of copolymers has been prepared by interpolymerizing monomeric formaldehyde or its cyclic trimer, trioxane, with an aromatic acetal having a structure represented by the formula

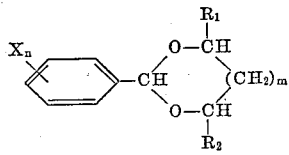

in which $R_1$ and $R_2$ each represent substituents selected from the group consisting of hydrogen, alkyl groups containing 1 to 4 carbon atoms, aryl groups, and aralkyl groups, X represents a substituent selected from the group consisting of halogen, and alkyl groups containing from 1 to 4 carbon atoms, $m$ is an integer from 0 to 1, and $n$ is an integer from 0 to 3.

Structurally, these new copolymers contain recurring oxymethylene groups interspersed with recurring groups derived from the aromatic acetal and having the structure

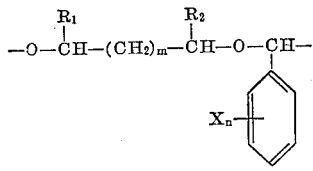

The aromatic acetals which are employed to prepare the new class of copolymers are themselves prepared by reacting benzaldehyde or a substituted-benzaldehyde with a vicinal glycol or a 1,3-diol in the presence of a catalytic amount of an acid, thereby forming the acetal. Among the aromatic acetals which may be used to prepare the new copolymers of the invention are those prepared from benzaldehyde, o-chlorobenzaldehyde, p-chlorobenzaldehyde, o-bromobenzaldehyde, p-bromobenzaldehyde, o-iodobenzaldehyde, 2,4-dichlorobenzaldehyde, 3,4-dichlorobenzaldehyde, 2,4,5-trichlorozenzaldehyde, 2,3,6-trichlorobenzaldehyde, tolualdehyde, cumaldehyde, anisaldehyde, 4-ethoxybenzaldehyde, 2,4-dimethoxybenzaldehyde, 3,4-dimethoxybenzaldehyde, and 3-methoxy-4-ethoxybenzaldehyde with such diols as ethylene glycol, 1,2-propanediol, 1,3-propanediol, 1,2-butanediol, 1,3-butanediol, 2,3-butanediol, neopentyl glycol, and pinacol. Excellent results have been obtained using 2-phenyl-1,3-dioxolane, which is the ethylene glycol acetal of benzaldehyde. The branched chains of the copolymer molecule may be terminated by hydroxyl groups, by ether groups, by carboxylate groups, by cyanoethyl groups, or by other end groups.

A wide range of molar proportions of the aromatic acetal may be incorporated in the copolymer depending upon the particular properties which are desired in the resultant copolymer. By way of illustration, particularly satisfactory molding properties may be obtained in those copolymers having a molecular weight in the range between about 10,000 and about 100,000 and containing from about 0.01 to about 7 percent by weight, based on the weight of the copolymer, of the recurring group derived from the aromatic acetal. The stability and processing characteristics of these copolymers are dependent upon the amount of aromatic acetal incorporated into the polymer structure. For example, the inclusion of as little as 0.01 percent by weight (based on the weight of the polymer) of the recurring unit derived from the aromatic acetal is sufficient to improve the corresponding homopolymer or copolymer containing oxyalkylene and oxymethylene units. In most instances, the presence of more than about 7 percent by weight of the recurring unit derived from the aromatic acetal in the polymer structure results in a product which no longer possesses desirable rheological properties. Optimum results are obtained when the copolymer possesses a molecular weight in the range from about 10,000 to about 100,000 (as determined viscosimetrically) and contains within its structure from about 0.05 to about 4 percent by weight (based on the weight of the polymer) of the recurring groups derived from the aromatic acetal.

Either monomeric formaldehyde or its trimer, trioxane, may be used to prepare the new copolymers of the invention. To obtain polymer products having the desired properties, however, the monomeric formaldehyde or trioxane should be substantially anhydrous, that is, contain less than 0.5 percent and preferably less than 0.1 percent by weight of water.

The interpolymerization of monomeric formaldehyde or trioxane and the aromatic acetal may be conducted at a temperature in the range from about 0° C. to about 100° C. (and preferably from 20° C. to about 70° C.) in the presence of a formaldehyde polymerization initiator, which functions to catalyze the copolymerization reaction. The formaldehyde polymerization initiator is generally employed in an amount in the range from about 0.001 to about 5 percent and, preferably, from 0.1 to 0.5 percent by weight, based on the weight of monomeric formaldehyde or trioxane which undergoes reaction using reaction temperatures in the range from about 20° C. to about 70° C.

Any acidic polymerization initiator may be used in the process of the invention, including Lewis acids, sulfuric acid, alkyl- and arylsulfonic acids, phosphoric acid, and boron trifluoride or its complexes, particularly when monomeric formaldehyde is the formaldehyde source. When trioxane is used as the source of recurring oxymethylene groups, best results have been obtained using as initiator boron trifluoride or a boron trifluoride coordinate complex with an organic compound in which oxygen or sulfur is the donor atom. The coordinate complex of boron trifluoride may be, for example, a complex with an alcohol, a phenol, an acid, an ether, an acid anhydride, an ester, a ketone, an aldehyde, a dialkyl sulfide, or a mercaptan. Particularly useful as initiators are boron trifluoride diethyl etherate and boron trifluoride di-n-butyl etherate.

The interpolymerization of monomeric formaldehyde or trioxane and aromatic acetal is usually carried out in a reaction medium which remains liquid under the polymerization conditions employed. Suitable reaction media include hydrocarbons containing 3 to 10 carbon atoms per molecule, such as propane, hexane, decane, cyclohexane, toluene, xylene and decahydronaphthalene; esters, such as methylene diacetate and methylene dipropionate (the use of both which is described in the copending, application of Henri Sidi, Ser. No. 133,783, filed Aug. 25, 1961, now United States Letters Patent No. 3,219,630); hydrocarbon halides; and ethers. As a general rule, the amount of the reaction medium used is within the range of 1 part to 1000 parts and in most cases 1 part to 100 parts by weight per part by weight of the comonomers.

The interpolymerization reaction may be carried out in any convenient manner. For example, anhydrous monomeric formaldehyde or trioxane may be introduced into a reactor containing the reaction medium, the aromatic acetal and the formaldehyde polymerization initiator. Alternatively, the formaldehyde polymerization initiator may be added to a mixture of the comonomers in the reaction medium or the formaldehyde (or trioxane), aromatic acetal, and formaldehyde polymerization initiator may be added simultaneously to the reaction medium. In either case, the copolymerization reaction may be carried out as a batchwise process or as a continuous process.

In addition to recurring oxymethylene groups and the recurring groups derived from the aromatic acetal, the new polymers of the invention may also contain other recurring structural groups, particularly oxyalkylene groups having at least two carbon atoms, in which event the resultant polymer is a terpolymer. Oxyethylene and substituted oxyethylene groups are especially desirable and may be incorporated into the polymer structure by including in the reaction mixture the desired amount of a cyclic ether having the structure

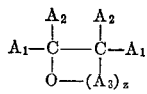

in which $A_1$ and $A_2$ represent hydrogen, alkyl groups having from 1 to 3 carbon atoms, or halogen-substituted alkyl groups having from 1 to 3 carbon atoms; $A_3$ represents methylene, oxymethylene, lower alkyl- or haloalkyl-substituted methylene, oxymethylene, lower alkyl- or haloalkyl-substituted oxymethylene groups; and $z$ represents an integer in the range of 0 to 3. Illustrative of these cyclic ethers are ethylene oxide and 1,3-dioxolane.

Upon entering into the interpolymerization reaction, these cyclic ethers undergo ring scission and become interspersed throughout the polymer as recurring groups having the structure

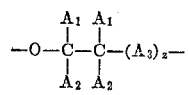

When incorporated in the polymer, oxyalkylene groups may comprise from about 0.1 to about 15 percent and, preferably, from 0.2 to 3 percent by weight of the weight of the terpolymer. Moreover, when oxyalkylene groups are incorporated in the polymer structure, then the combined weight of the oxyalkylene groups and the groups derived from the aromatic acetal should not exceed 20 percent of the weight of the terpolymer.

Other recurring groups may also be incorporated into a polymer structure which contains recurring oxymethylene groups and recurring groups derived from the aromatic acetals. These other recurring units (which may be in lieu of or in addition to the recurring oxyalkylene groups described above) may be difunctional, trifunctional or tetrafunctional groups derived in turn, from compounds which are capable of undergoing interpolymerization with monomeric formaldehyde or trioxane, and the aromatic acetal. These compounds include cyclic ethers having at least two cyclic ether rings, such as polyepoxides and polyformals of polyhydric alcohols; dialdehydes and diketones; and alkylene dicarboxylates. Specific examples of these comonomers are 2,2-(trimethylene)-bis-1,3-dioxolane, pentaerythritol diformal, glyoxal, glutaraldehyde, and methylene diacetate to cite but a few.

Since the rates at which the aromatic diacetal and the aforementioned cyclic ethers undergo interpolymerization are somewhat lower than the rates at which monomeric formaldehyde or trioxane react under the interpolymerization reaction conditions, it is frequently necessary to use excess amounts of these comonomers during the polymerization reaction so that the desired amount may be incorporated within the polymer structure. For example, the incorporation within the polymer structure of from about 0.01 to about 7 percent by weight (based on the weight of the polymer) of recurring groups from the aromatic acetal usually requires the use in the polymerization reaction of from about 0.05 to about 20 percent by weight (based on the weight of the formaldehyde source) of the aromatic acetal, while the incorporation of from about 0.05 to about 4 percent by weight of recurring groups derived from the aromatic acetal usually requires from about 0.1 to about 10 percent by weight of the aromatic acetal in the polymerization reaction, based on the weight of the formaldehyde source. Similarly, the incorporation of from about 0.1 to about 25 percent by weight, based on the weight of the polymer, of recurring oxyalkylene groups derived from a cyclic ether usually requires the use in the polymerization reaction of from about 0.5 to about 25 percent by weight of the cyclic ether, based on the weight of the monomeric formaldehyde or trioxane employed in the process.

The formation of the polymers (copolymers and terpolymers) of the present invention is best effected under non-oxidizing conditions. A convenient way of obtaining such conditions involves sweeping the reactor with a dry inert gas, such as nitrogen, and carrying out the copolymerization under a blanket of the inert gas. In addition an antioxidant may be present during the reaction and/or may be added to the product to reduce oxidative effects. Among the antioxidants that are useful for this purpose are phenothiazine, 2-mercapto-benzimidazole, diphenylamine, phenyl-α-naphthylamine, bis-(β-naphthylamino)-p-phenylenediamine, 4,4′-butylene-bis-(3-methyl-6-t-butylphenol), and 5-ethyl-10,10-diphenylphenazasiline. The amount of antioxidant used is approximately 0.01 percent to 1 percent based on the weight of the comonomers.

To prevent degradation of the copolymer resulting from prolonged contact with the polymerization initiator, it is generally desirable to remove or neutralize the initiator upon completion of the polymerization step. When boron trifluoride or a boron trifluoride coordinate complex is used as the initiator, the reaction mixture may be treated with an alkaline material, for example, an aliphatic amine, such as tri-n-phenylamine, or an alkali metal salt of an alkanoic acid having from 1 to 18 carbon atoms, to neutralize the initiator. Other initiators may be removed by washing the reaction mixture with water or a suitable organic solvent.

Because improved thermal stability of the polymers may be obtained by using an after-treatment that entails blocking or "capping" of the terminal hydroxyl groups of the polymer chains, it is frequently desirable (though not essential) to chemically stabilize the resultant polymer by acylation, etherification, cyanothylation, or other such procedures. Alternatively, the raw polymer may be subjected to the controlled degradation (or partial depolymerization) of the polymer chain, for example, by heating or by washing with an alkaline solution, until a terminal group is reached that is inert to further chemical or physical degradation. Excellent results have been obtained by heating the raw polymer to a temperature in the range from about 140° C. and about 220° C. with cyanoguanidine and a phenolic antioxidant to improvide its thermal stability.

The following examples are illustrative of the ease with which formaldehyde or trioxane may be copolymerized with an aromatic acetal to prepare the new polymers of the invention:

were prepared by injection molding this copolymer composition at 300–1200 pounds injection pressure. The stability of the composition was determined by subjecting a series of the molded bars to steam at 135° C., removing bars periodically, and measuring their properties. For comparative purposes, a homopolymer of formaldehyde and a copolymer of formaldehyde which contained approximately 2.6 percent of combined ethylene glycol (but no groups derived from the aromatic acetal) were included in the test. The results of these tests are set forth in Table I.

TABLE I

| Properties after exposure to steam at 135° C. for indicated number of hours | Product of Example I | Formaldehyde Polymer | |
|---|---|---|---|
| | | Formaldehyde homopolymer | Formaldehyde Copolymer containing ca. 2.6% combined ethylene glycol |
| 0 Hours: | | | |
| Tensile strength (p.s.i.) | | | 8,150 |
| Yield point | 7,900 | | |
| Ultimate tensile strength | 7,550 | 8,900 | 7,250 |
| Percent elongation | 70 | 19 | 94 |
| 24 Hours: | | | |
| Percent change in weight | +1.98 | Failed at 16 hours. | +3.54 |
| Tensile strength (p.s.i.) | | | 7,300 |
| Yield point | | | 7,100 |
| Ultimate tensile strength | 7,350 | | 89 |
| Percent retention tensile strength | 93 | | 85 |
| Percent elongation | 60 | | 90 |
| Percent retention elongation | 86 | | |
| 48 Hours: | | | |
| Percent change in weight | +1.03 | | +3.17 |
| Ultimate tensile strength (p.s.i.) | 7,100 | | 7,400 |
| Percent retention tensile strength | 90 | | 91 |
| Percent elongation | 51 | | 44 |
| Percent retention elongation | 73 | | 47.5 |
| 72 Hours: | | | |
| Percent change in weight | +0.47 | | +2.48 |
| Ultimate tensile strength (p.s.i.) | 6,600 | | 7,300 |
| Percent retention tensile strength | 83 | | 89 |
| Percent elongation | 21 | | 48 |
| Percent retention elongation | 30 | | 51 |
| 96 Hours: | | | |
| Percent change in weight | −0.35 | | +1.28 |
| Ultimate tensile strength (p.s.i.) | 6,300 | | 4,100 |
| Percent retention tensile strength | 80 | | 50 |
| Percent elongation | 19 | | 9 |
| Percent retention elongation | 27 | | 9.5 |

EXAMPLE I

A mixture of 392 grams of trioxane, 10 ml. of 2-phenyl-1,3-dioxolane, 170 grams of cyclohexane, and 0.12 ml. of boron trifluoride diethyl etherate was stirred and heated at a temperature in the range of 47° C. to 65° C. for 40 minutes. The reaction mixture was washed with 1000 ml. of acetone that contained 2 ml. of n-tributylamine and then with 1000 ml. of cold water, with 1000 ml. of water at 70° C., and finally with two 1000 ml. of portions of acetone. The product was then dried under vacuum at 65° C. There was obtained 154 grams of a trioxane/2-phenyl-1,3-dioxolane copolymer that had an average molecular weight of 30,600, as determined viscosimetrically. Vapor phase chromatographic analysis indicated that the mixture of products obtained from the hydrolytic degradation of the copolymer contained 1.62 percent by weight of ethylene glycol. The amount of benzaldehyde in the copolymer could not be determined, however, because the benzaldehyde apparently is destroyed under the acid condition of hydrolysis. This phenomenon even occurs when paraformaldehyde, containing a known amount of benzaldehyde, is subjected to acid hydrolysis, for no benzaldehyde could be recovered under such conditions. However, the hydrolysate of the copolymer nonetheless exhibited considerable absorption in the ultraviolet, indicating the probable presence of aromatic rings in the hydrolysate.

The hydrolytic stability of this copolymer was determined by the following procedure: The copolymer was heated at 200° C. for 30 minutes with 0.7 percent by weight of cyanoguanidine and 2 percent by weight of 2,2'-methylene-bis-(4-methyl-6-tert. butylphenol). Tensile bars From the data contained in Table I, it is evident that the molded bars of the new copolymer of the invention demonstrated greater resistance to hydrolytic degradation when exposed to steam at 135° C. for a prolonged period of time than did either the formaldehyde homopolymer or the copolymer than contained combined ethylene glycol.

EXAMPLE II

A mixture of 392 grams of trioxane, 5 grams of glyoxal-bis-(ethylene glycol acetal), 5 grams of 2-phenyl-1,3-dioxolane, 170 grams of cyclohexane, and 0.12 ml. of boron trifluoride diethyl etherate was stirred and heated at a temperature in the range of 47° C. to 63° C. for 40 minutes. The resulting product was washed and dried by the procedure described in Example I to yield 170 grams of a trioxane/glyoxal-bis-(ethylene glycol acetal)/2-phenyl-1,3-dioxolane terpolymer that had a molecular weight of 28,900, as determined viscosimetrically. Upon acid hydrolysis of the terpolymer, the benzaldehyde was apparently degraded and could not be quantitatively determined. Analysis of the hydrolysate revealed 0.18 percent by weight of glyoxal, which was determined as its 2,4-dinitrophenylhydrazone, and 1.52 percent by weight of ethylene glycol which was determined by vapor phase chromatography.

EXAMPLE III

A mixture of 1275 grams of trioxane, 6.0 grams of 2 - phenyl - 1,3 - dioxolane, 31.8 grams of 1,3 - dioxolane, 525 grams of cyclohexane, and 0.4 ml. of boron trifluoride diethyl etherate was stirred and heated at a temperature in the range of 50° C. to 66° C. for 60 minutes. The resulting product was washed and dried by the procedure described in Example I to yield 967 grams of a trioxane/2 - phenyl - 1,3 - dioxolane/1,3 - dioxolane terpolymer that had an average molecular weight of 21,000, as measured viscosimetrically. Vapor phase chromatographic analysis of the hydrolysate showed that the original terpolymer contained 2.62 percent by weight of ethylene glycol.

EXAMPLE IV

A mixture of 1275 grams of trioxane, 31.8 grams of 2-phenyl-1,3-dioxolane, 525 grams of cyclohexane, and 0.4 ml. of boron trifluoride diethyl etherate was stirred and heated at a temperature in the range of 50° C. to 67° C. for 60 minutes. The resulting product was washed and dried by the procedure described in Example I to yield 780 grams of a trioxane/2-phenyl-1,3-dioxolane copolymer that had an average molecular weight of 19,600, as measured viscosimetrically. Vapor phase chromatographic analysis of a hydrolysate of the copolymer indicated that the mixture of products obtained from the hydrolytic degradation of the copolymer contained 1.47 percent by weight of ethylene glycol.

EXAMPLE V

The resistance of the new copolymers and terpolymers of the invention to hydrolytic degradation was measured by the following procedure: A 4-gram sample of the powdered polymer was heated with 200 grams of water at the reflux temperature of the mixture for 24 hours. After cooling, the mixture was filtered and the solid polymer dried under vacuum and weighed. The loss in weight is indicative of the degradation of the polymer that occurred during the heating period. The results obtained in this test series are set forth in Table II.

TABLE II

| Polymer: | Percent loss in weight on heating in boiling water for 24 hours |
|---|---|
| Product of Example I | 6.11 |
| Product of Example III | 8.48 |
| Product of Example IV | 6.42 |
| Acetylated formaldehyde homopolymer (mol. wt., 49,000) | 12.3 |

I claim:
1. A normally solid, thermally stable polyacetal terpolymer having a molecular weight, as determined viscosimetrically, in the range from about 10,000 to about 100,000 and consisting essentially of (a) randomly recurring oxymethylene groups, (b) from about 0.01 to about 7 percent by weight, based on the weight of the terpolymer, of randomly recurring groups having the structure

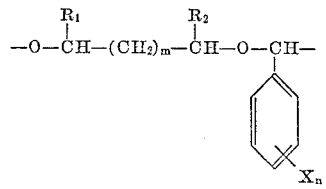

where groups are derived from an aromatic acetal having a structure represented by the formula

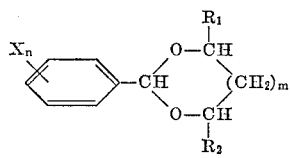

in which $R_1$ and $R_2$ each represent substituents selected from the group consisting of hydrogen, alkyl groups containing 1 to 4 carbon atoms, aryl groups, and aralkyl groups, X represents a substituent selected from the group consisting of halogen, and alkyl groups containing from 1 to 4 carbon atoms, $m$ is an integer from 0 to 1, and $n$ is an integer from 0 to 3, and (c) from about 0.1 to about 15 percent by weight, based on the weight of the terpolymer, of randomly recurring oxyalkylene groups having a structure represented by the formula

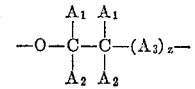

which groups are derived from a cyclic ether having a structure represented by the formula

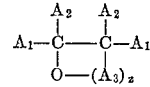

in which $A_1$ and $A_2$ each represent substituents selected from the group consisting of hydrogen, alkyl groups having from 1 to 3 carbon atoms, and halogen-substituted alkyl groups having from 1 to 3 carbon atoms, $A_3$ represents a divalent substituent selected from the group consisting of methylene, oxymethylene, lower alkyl- and haloalkyl-substituted methylene, and lower alkyl- and haloalkyl-substituted oxymethylene groups, and $z$ is an integer in the range from 0 to 3, the combined weight of all recurring groups other than oxymethylene not exceeding 20 percent by weight of the terpolymer.

2. A normally solid, thermally stable polyacetal terpolymer having a molecular weight, as determined viscosimetrically, in the range from about 10,000 to about 100,000 and consisting essentially of (a) randomly recurring oxymethylene groups, (b) from about 0.05 to about 4 percent by weight, based on the weight of the terpolymer, of randomly recurring groups having the structure

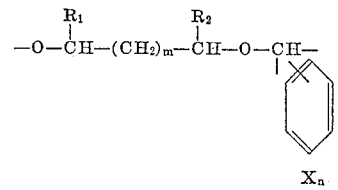

which groups are derived from an aromatic acetal having a structure represented by the formula

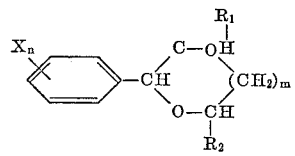

in which $R_1$ and $R_2$ each represent substituents selected from the group consisting of hydrogen, alkyl groups containing 1 to 4 carbon atoms, aryl groups, and aralkyl groups, X represents a substituent selected from the group consisting of halogen, and alkyl groups containing from 1 to 4 carbon atoms, $m$ is an integer from 0 to 1, and $n$ is an integer from 0 to 3, and (c) from about 0.2 to about 3 percent by weight, based on the weight of the terpolymer, of randomly recurring oxyalkylene groups having a structure represented by the formula

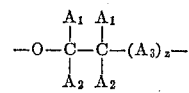

which groups are derived from a cyclic ether having a structure represented by the formula

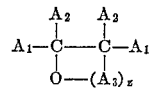

in which $A_1$ and $A_2$ each represent substituents selected from the group consisting of hydrogen, alkyl groups having from 1 to 3 carbon atoms, and halogen-substituted alkyl groups having from 1 to 3 carbon atoms, $A_3$ represents a divalent substituent selected from the group consisting of methylene, oxymethylene, lower alkyl- and haloalkyl-substituted methylene, and lower alkyl- and haloalkyl-substituted oxymethylene groups, and z is an integer in the range from 0 to 3, the combined weight of all recurring groups other than oxymethylene not exceeding 20 percent by weight of the terpolymer.

3. A normally solid, thermally stable polyacetal terpolymer having an average molecular weight, as determined viscosimetrically, in the range from about 10,000 to about 100,000 and consisting essentially of (a) randomly recurring oxymethylene groups, (b) from about 0.05 to about 4 percent by weight, based on the weight of the terpolymer, of randomly recurring groups derived from 2-phenyl-1, 3-dioxolane and having a structure represented by the formula

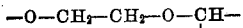

and (c) from about 0.2 to about 3 percent by weight, based on the weight of the terpolymer, of recurring oxyethylene groups, the combined weight of all recurring groups other than oxymethylene not exceeding 7 percent by weight of the terpolymer.

References Cited

UNITED STATES PATENTS

| | | | |
|---|---|---|---|
| 2,394,910 | 2/1946 | Gresham | 260—2 |
| 3,027,352 | 3/1962 | Walling et al. | 260—67 |
| 3,256,246 | 6/1966 | Gutweiler et al. | 260—67 |
| 3,272,780 | 9/1966 | Wilson et al. | 260—67 |
| 3,275,604 | 9/1966 | Kray | 260—67 |

WILLIAM M. SHORT, *Primary Examiner.*

L. M. PHYNES, *Assistant Examiner.*

UNITED STATES PATENT OFFICE
CERTIFICATE OF CORRECTION

Patent No. 3,384,620     May 21, 1968

Henri Sidi

It is hereby certified that error appears in the above numbered patent requiring correction and that the said Letters Patent should read as corrected below.

Column 1, line 48, "repreesnts" should read -- represents --. Column 2, line 2, "2,4,5-trichlorozenzaldehyde" should read -- 2,4,5-trichlorobenzaldehyde --. Column 3, line 16, after "both" insert -- of --. Column 4, line 36, "dervied" should read -- derived --; line 63, "tri-n-phenylamine" should read -- tri-n-butylamine --. Column 7, line 61, "where" should read -- which --. Column 8, lines 33 to 40, the formula should appear as shown below:

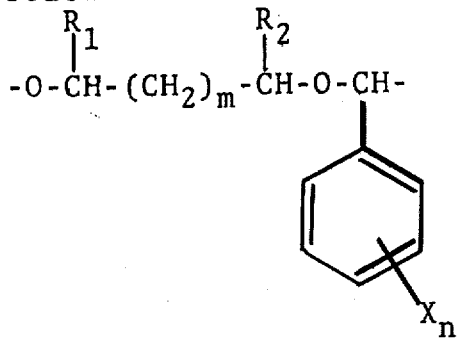

Signed and sealed this 28th day of October 1969.

(SEAL)
Attest:

EDWARD M. FLETCHER, JR.      WILLIAM E. SCHUYLER, JR.
Attesting Officer            Commissioner of Patents